E. FABIAN & F. WIDMARK.
POWER TRANSMITTER.
APPLICATION FILED JUNE 6, 1910.

1,023,366.

Patented Apr. 16, 1912.
5 SHEETS—SHEET 1.

Witnesses:
K. H. Hansen
W. H. Williams

Inventors:
Edwin Fabian & Fredrick Widmark
by: John E. Stryker
Attorney

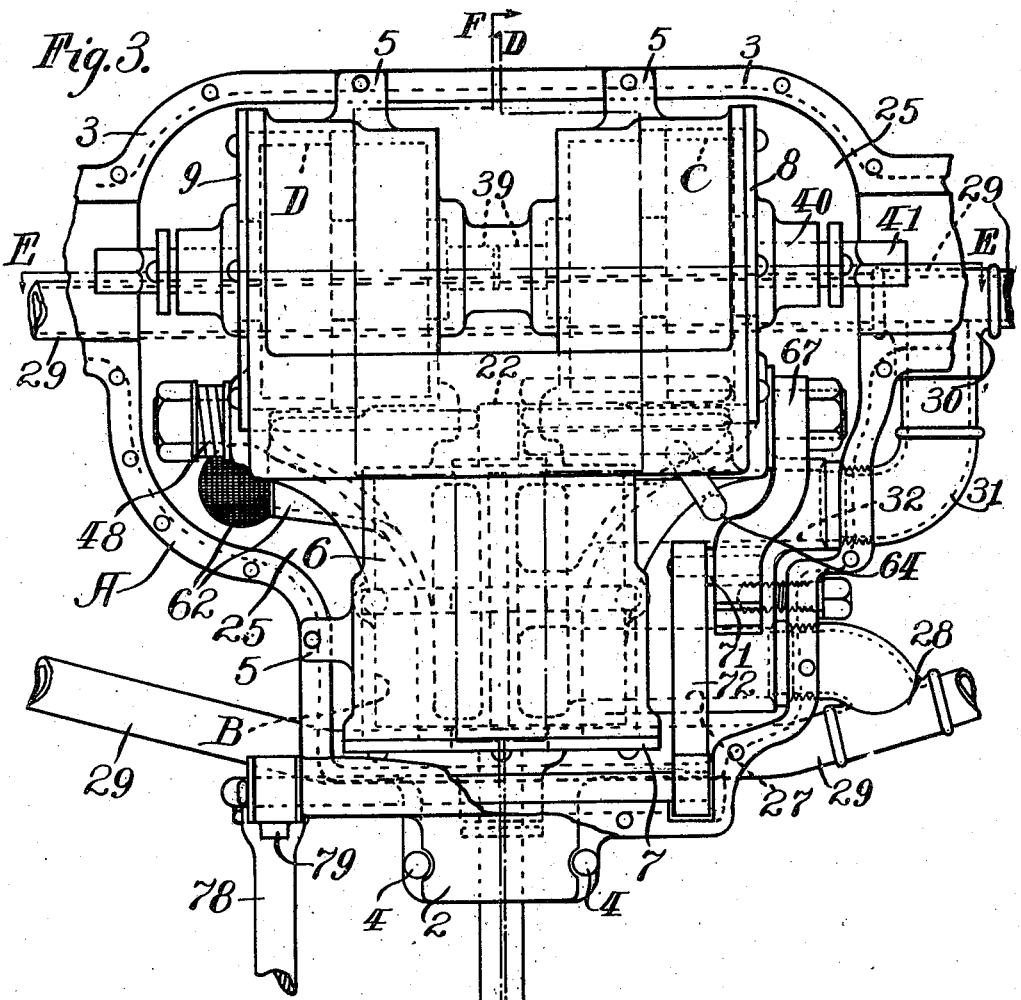

E. FABIAN & F. WIDMARK.
POWER TRANSMITTER.
APPLICATION FILED JUNE 6, 1910.
1,023,366.
Patented Apr. 16, 1912.
5 SHEETS—SHEET 3.
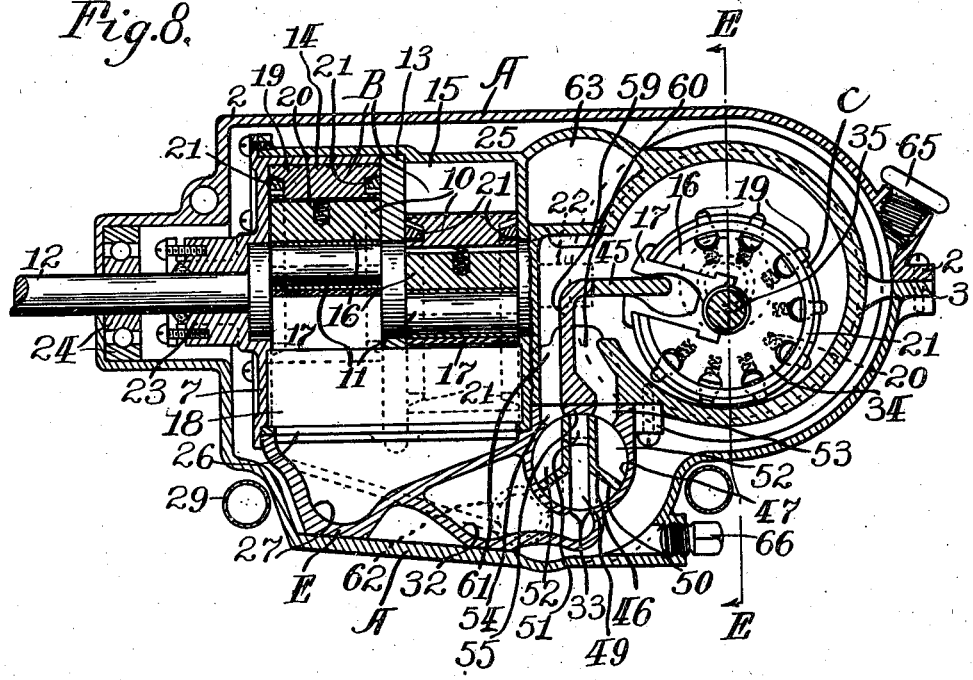
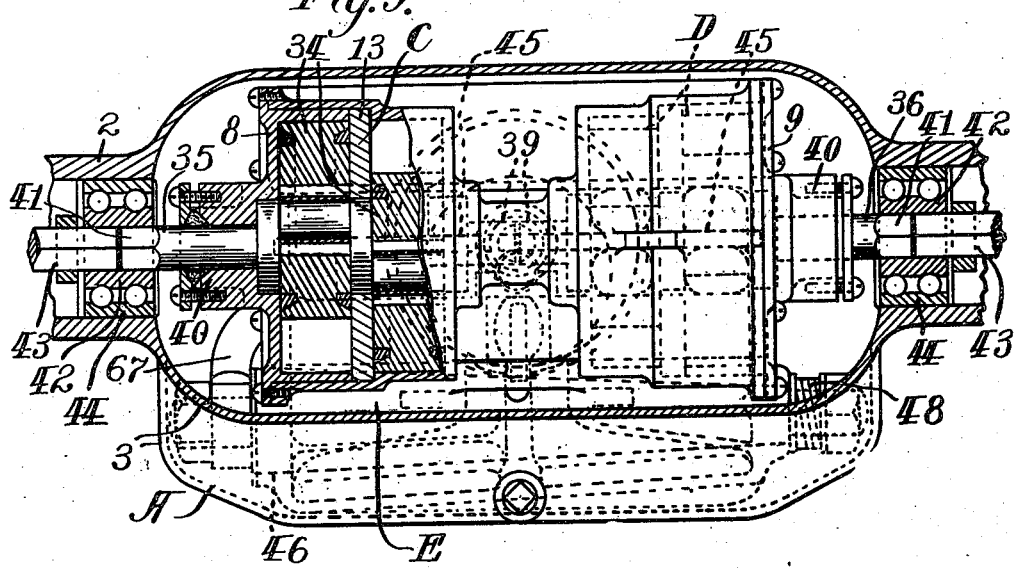
Witnesses:
K. H. Hansen
W. H. Williams
Inventors:
Edwin Fabian & Fredrick Widmark
by John E. Stryker
Attorney.

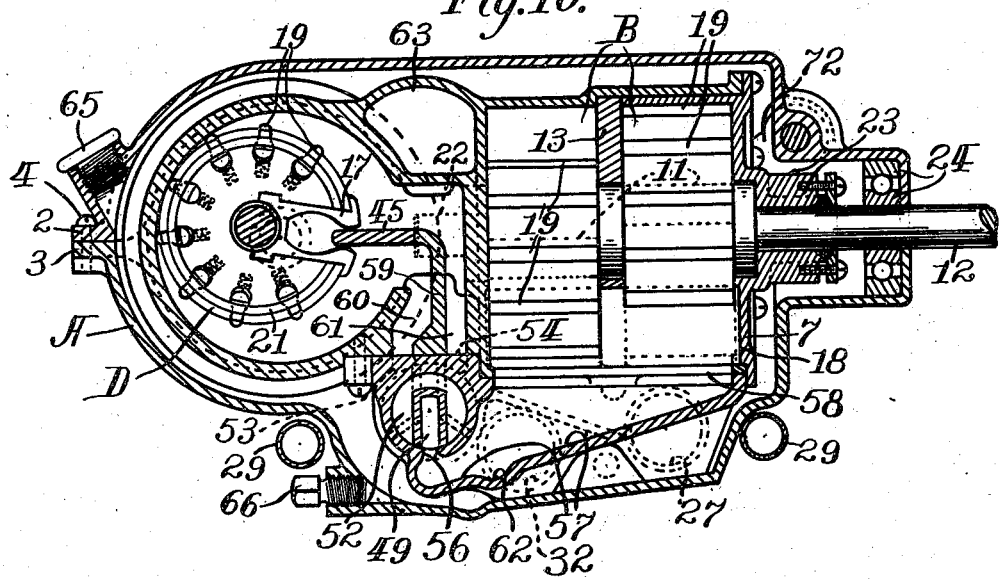
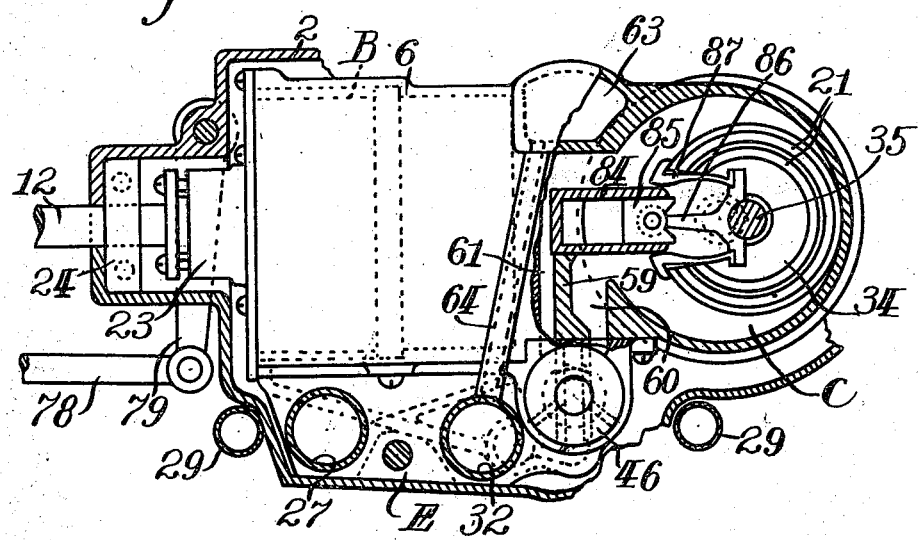

E. FABIAN & F. WIDMARK.
POWER TRANSMITTER.
APPLICATION FILED JUNE 6, 1910.
1,023,366.
Patented Apr. 16, 1912.
5 SHEETS—SHEET 5.
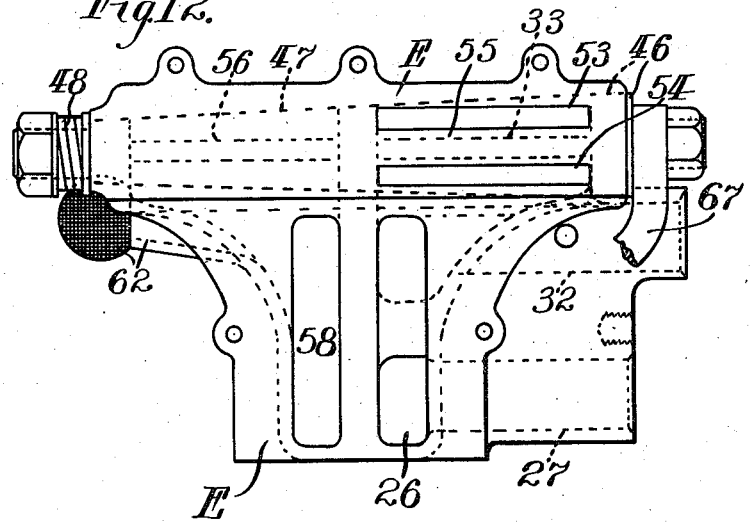
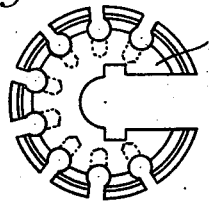
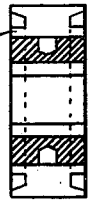
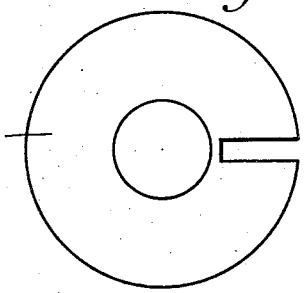
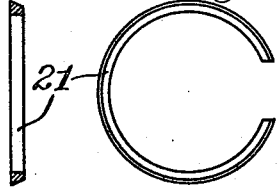
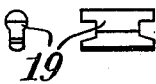
Witnesses:
Inventors:
Edwin Fabian & Fredrick Widmark
by John E. Stryker
Attorney.

UNITED STATES PATENT OFFICE.

EDWIN FABIAN AND FREDRICK WIDMARK, OF ST. PAUL, MINNESOTA.

POWER-TRANSMITTER.

1,023,366.  Specification of Letters Patent.  Patented Apr. 16, 1912.

Application filed June 6, 1910. Serial No. 565,396.

*To all whom it may concern:*

Be it known that we, EDWIN FABIAN and FREDRICK WIDMARK, citizens of the United States, residing at St. Paul, in the county of Ramsey and State of Minnesota, have invented new and useful Improvements in Power-Transmitters, of which the following is a specification.

Our invention relates to improvements in power transmitters, and particularly, although not exclusively, to those used in connection with motor vehicles.

Our object in this invention is to provide a device which shall be simpler and lighter, more efficient in transmitting power and more flexible in control than those now in use and to embody in its structure means for differentiating the speeds of the drive wheels. The device with which we seek to accomplish these results is a rotary power pump mounted on a power shaft and supplying a fluid medium to similar rotary fluid motors which are directly connected with the drive wheels of the vehicle. The motors are independent of each other in action but are driven by fluid supplied to the two motors from a common source and under uniform pressure, so that the two wheels may assume different speeds under the same pressure, as required by changes in the direction of travel of the vehicle.

The principal advantages which our machine has over other transmitters now in use are in the efficiency of transmission, involving no theoretical loss of power at different transmitted speeds, the efficiency of our rotary pistons at low speeds, and the automatic action of the differential, together with complete and flexible control of the transmitted speed and a safe and reliable reversing mechanism.

Figure 1:
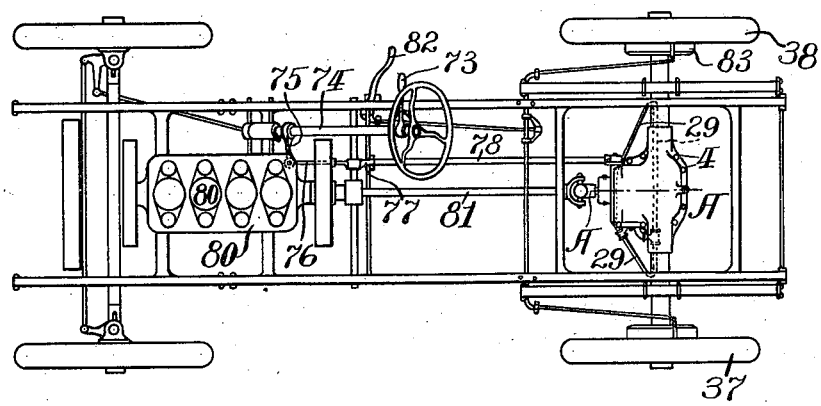
Figure 2:
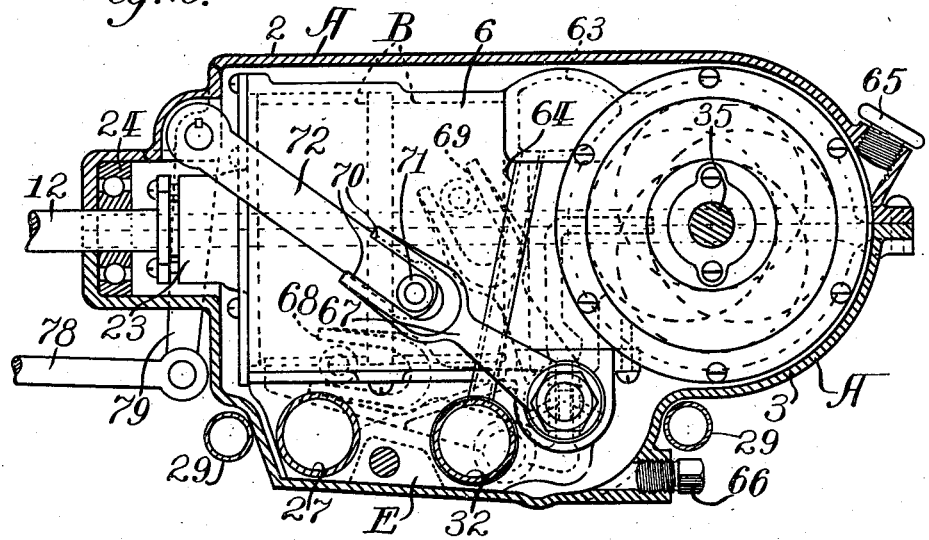

In the drawings by which we have illustrated our invention and which form part of this specification, Figure 1 is a plan of an automobile having our transmitter interposed between the engine and the rear drive wheels; Fig. 2 shows an elevation of the pump casing of our device with the outer shell cut away on the line A—A, Fig. 1, and showing different positions of the controlling lever; Fig. 3 is a plan of our device with the upper part of the outer shell removed showing the pump casing; Fig. 4 is a detail side view of the controlling valve; Fig. 5 is a bottom view of the same; Fig. 6 is a section on the line B—B, Fig. 4; Fig. 7 is a section on the line C—C, Fig. 4; Fig. 8 is a section on the line D—D, Fig. 3, showing oil passages on the outlet side of the drive pump; Fig. 9 is a partial section on the line E—E, Figs. 3 and 8; Fig. 10 is a section on the line F—F, Fig. 3, showing oil passageways on the inlet side of the drive pump; Fig. 11 is a partial section showing an alternate construction of the piston key; Fig. 12 is a plan of the valve casing with the valve in position, and Figs. 13 to 23 inclusive, illustrate mechanical details of our device.

As we have designed our device, it is made up of an outer shell A composed as hereinafter stated of several parts, a rotary drive pump B on the engine shaft, motors C and D operated by fluid from the pump B and connected with the drive wheels, and a control valve casing E.

The shell or casing A is made up of top and bottom parts 2 and 3, fastened together to form an oil tight casing by suitable bolts 4. Within the shell, attached thereto by lugs 5, lying between the parts 2 and 3 thereof, is the pump casing for the pumps B, C and D. This casing consists of a main portion 6 which has cylinders for pumps B, C, and D and connecting passageways, and cylinder heads 7, 8 and 9 inclosing the pumps B, C, and D respectively.

The pump B consists of two rotary pistons 10 rotatably mounted on cranks 11 of the shaft 12 and separated by the septum 13 which divides the cylinder into two piston chambers 14 and 15. These cranks are situated 180 degrees apart on the shaft 12 for the purpose of equalizing the flow of oil from the pump. Each of the rotary pistons is made up of a cylindrical body 16 having a recessed guide piece 17 in its periphery which engages a piston key 18 extending across the pump B, through the septum and the recesses of both pistons as shown in Figs. 8 and 10 of the drawings. The form of the key 18 is like that of the key 45 more fully hereinafter described.

Each cylindrical piston is mounted on its central axis and as it oscillates upon the cranks of the rotating shaft, guided by the piston key 18, its periphery describes a circle close to the pump casing, with which each piston makes an oil tight joint by means of transverse metal packing strips 19 set in slots on its periphery and expanded by radially acting springs 20 in the piston body. The lateral faces of the piston have metal packing rings 21 between the piston body 16 and the cylinder heads, and septum 13. These packing rings are circular, lying in slots near the periphery of the piston and extending to the recessed guide 17. Each packing ring has an outwardly beveled edge fitting a similarly beveled side of the slot in which it lies, and is made of spring material having a less curvature than the slot in which it lies, so that the spring of the ring outwardly forces its beveled edge against the beveled side of the slot and causes the ring to rise out of the slot and press against the wall of the piston chamber, producing a tight joint. The shaft 12 has a bearing 22 in the pump casing, passes out through the stuffing box 23, and rests in the ball bearing 24 in the shell A.

The piston key 18 lying parallel with the shaft 12, serves to separate the ingress and egress ports of the pump B and from those ports extend through the valve casing E, passageways connecting with the motors C and D, and the reservoir 25 which occupies the space between the shell A and the pump casing. From the egress port 26 of the pump B extends the passageway 27 connecting at 28 to the pipe cooler 29 which extends below the shell A, across the frame of the vehicle, forming a complete circulation for the fluid. At 30 the motor feed pipe joins the circulation taking fluid from either or both directions in the pipe cooler. The ingress pipe 31 connects to an ingress passage 32 in the valve casing E and through this with the valve port 33.

The motors C and D are similar in construction to the drive pump B and are designed to be run at their full capacity by the fluid pumped through the pump B. The pistons 34 of these motors are mounted on shafts 35 and 36 lying on the axis of the drive wheels 37 and 38 and connected with the respective drive wheels but are independent of each other. The two motors are laterally symmetrical about the axis of the pump B. Each shaft has a bearing 39 in the pump casing, and a stuffing box 40. The end 41 of the shaft engages a sleeve 42 which also engages the end 43 of the drive axle of a wheel. The sleeve 42 is supported in a ball bearing box 44. By this means the short shafts carrying the motor pistons may be readily removed from the machine. A piston key 45 is common to the motors C and D, extending entirely across them and divides the ingress and egress ports of the motors.

Between the motors C and D and the pump B, directing and controlling the flow of fluid from the pump to the motors, lies the controlling valve 46 in the valve casing E. The valve casing E is situate directly below the pump B and the valve 46, which is conical in its outlines, is fitted to a conical valve chamber 47 extending across the pump casing parallel to the shafts of the motors. The valve is held in contact with the walls of the valve chamber by a nut at its smaller end and a tight coiled spring 48 between the nut and valve box. The valve has a slotted passage 49 opening on the bottom of the valve for its entire length and having an expanded part 50 at its large end, which opens through the top of the valve into a port 51, said port extending but half the length of the valve. At the small end of the cone the body portion of the valve is cut away both at the top and sides to form a by-pass 52 which extends around the passageway 49 toward the end of the cone as clearly shown in Fig. 10 of the drawings.

The sides are cut away throughout the entire length of the valve and form the valve bearings which divide the valve chamber into sections as clearly shown in Fig. 8 of the drawings.

The valve chamber has, in its larger portion, the port 33 mentioned above, registering with the enlarged passage 50 of the valve, and two ports 53 and 54 in its upper part (separated by the bridge 55) which are fitted to register with the port 51 when the valve is turned to the proper position. At its small end the valve chamber has a single egress port 56 on its lower side, connecting through the passage 57 with the ingress port 58 of the pump B and registering with the passage 49 of the valve at its narrow part, at the same time that the port 51 registers with the bridge 55 and registering with the by-pass 52 at all other positions of said valve.

Above the bridge 55, in the assembled transmitter, rests a partition 59 which connects the bridge with the piston key 45 and serves to separate the ingress and egress passages to the motors C and D. These passages 60 and 61 extend across both motors and open at the ports 53 and 54 in the valve casing E.

The passage 57 receives fluid from the valve chamber 47 and also through the feed pipe 62 from the reservoir 25. In the upper part of the casing 6 is an inclosed chamber 63 connected by a pipe 64 with the valve ingress passage 32. This chamber furnishes an overflow and air cushion for the motor side of the oil circulation. In the upper part of the shell A is a filling aperture closed by the plug 65 and at the bottom of the shell, a drain closed by the plug 66.

At the large end of the valve 46, outside the pump casing and within the shell A, is a lever 67 fitted to rotate the valve between the extreme positions 68 and 69 shown in broken lines in Fig. 2, these limits being determined by the registering of the port 51 with the ports 54 and 53. The lever 67 has a split end 70 in which travels the wrist-pin

71 of the crank 72, which operates the lever. The crank 72 is operated by a handle 73 on the steering wheel, through the connected sleeve 74, lever 75, link 76, bell crank 77, link 78 and the lever arm 79. Obviously it could also be operated by a foot pedal or any other similar device.

The power is applied to shaft 12 of the pump B from the engine 80 through a drive shaft 81.

82 is a lever operating an emergency brake 83 which may be applied to the vehicle.

In the alternate construction shown in Fig. 11, the key 45 is replaced by a trough-shaped piece 84 extending across the motors in the same position as the piston key. Transversely in this trough moves the sliding head 85 which is pivoted on the bar 86. This bar is rigidly connected with the piston body and guides it in its oscillation. The springs 87 form a tight joint with the outer sides of the trough and the use of two lateral packing rings 21 is shown.

The construction shown in our drawings is especially adapted to the requirements of an automobile. The form may be changed, however, to that of a simple transmission, with a single pump and a single motor which may be in any desired position relative to each other. The cooler pipes may be made the connection between the motor and the pump.

In operating our device the control valve 46 manipulated by the controlling lever 73, is set in the position shown in Figs. 2 and 8 with the port 51 closed against the bridge 55. The engine is started and the pistons 10 of the pump B oscillate, pumping oil through the port 26 and passage 27 into the cooler 29. When these parts are full, the oil flows through the pipe 31 and the passage 32 to the port 33 and into the slotted passage 49. Since the port 51 is closed, the oil flows along the passage 49 through the port 56 and passage 57 to the ingress port 58 of the pump B. This circulation of oil may continue indefinitely or until the control valve is moved toward one of the positions 68 or 69.

If the vehicle is to be started forward, the valve is turned toward the position 69 so that the port 51 will register with the port 53 and the passageway 60. The oil flowing through this port is distributed equally to the two motors C and D and causes them to rotate equally. The oil passing through the motors returns through the port 54 to the by-pass 52, through which it passes to the other end of the valve casing and out through the port 56 to the passage 57 and the pump B, thereby completing the circulation of the fluid in the transmitter.

If the vehicle is to be started backward, the valve is turned into the position 68 causing the port 51 to register with the port 54 and the passage 61. The oil pumped by the pump B will then traverse the motor in the opposite direction, revolving it reversely and flowing through the port 53 into the by-pass 52, then through the port 56 and passage 57 to the pump B.

When the vehicle is advancing and it is desirable to either retard its speed or reverse its motion, the valve 46 being in the position 69, it is gradually moved toward the position 68. As it moves to this position, the opening of the port 51 is shut off by the bridge 55 and when the valve is in the position shown in Figs. 2 and 8, there is no flow of oil through the port 51. The same movement brings the passage 49 to register with the port 56 and the flow of oil from the pump traverses the passage 49 and completes its circulation through the port 56 and passageway 57. As the vehicle is still moving forward under its momentum, the pistons 34 in the motors C and D continue to rotate and act as pumps upon the oil confined within the piston chamber. This oil being pumped by the motors through the port 54, traverses the by-pass 52 and returns to the motor through the port 53. The motors may continue to run in this way indefinitely. As the movement of the valve toward the position 68 continues, the wall of the valve impinges upon the port 54 lessening the aperture through which the oil can pass from the motors and tending to retard their motion, and at the same time the port 56 begins to open into the by-pass 52. As the port 51 begins to connect with the port 54, the connection between the passage 49 and the port 56 is closing and the pressure of oil is exerted against the forward motion of the motor piston. This pressure increases with the opening of port 54 and under the action of the pump B until the pistons 34 are stopped and their motion reversed.

In turning the vehicle, the dragging of one wheel permits the oil or other fluid to follow the line of least resistance and feed more rapidly to the opposite motor.

Having described our invention, what we claim as new and desire to protect by Letters Patent is:

1. A power transmitter comprising in combination, a driving element, a pump connected with said driving element, driven elements, motors connected with said driven elements, valved passageways communicating with said pumps and motors, a body of fluid connecting said pump and motors through said passageways and a fluid tight reservoir supported by said driven elements and surrounding said pump and motors.

2. A power transmitter comprising in combination, a drive shaft, a rotary power pump on said shaft, rotary fluid motors, a body of fluid connecting said pump and motors, driven elements with which said motors are connected independently, adapting them to assume different speeds under the same fluid pressure and a fluid tight casing forming a combined jacket and oil reservoir surrounding said pump and motors.

3. In a power transmitter, a drive shaft, pump pistons on said shaft, driven shafts, motor pistons on said driven shafts, cylinders integral with each other surrounding said pump and motor pistons, passageways between said cylinders, a body of fluid connecting said pump and motor cylinders through said passageways, a single valve for controlling the flow of said fluid to rotate the motors in either direction, or prevent the operation of the same and a fluid tight casing surrounding said cylinders in communication therewith and supported by said driven shafts.

4. In a power transmitter a driving shaft, pump pistons on said shaft, driven shafts, motor pistons on said shafts, integral pump and motor cylinders for said pump and motor pistons, passageways between the pump and motor cylinders, a body of fluid communicating with said cylinders through said passageways, a pipe cooler for said fluid, a valve for controlling the flow of the fluid whereby said motors may be operated in either direction at any desired speed and a fluid tight casing surrounding said cylinders in communication therewith and supported on said driven shafts.

5. A power transmitter comprising in combination, a driving element, a pump on said driving element, driven elements, motors on said driven elements adjacent to said pump, a body of fluid communicating with said pump and motors, a valve for controlling the flow of said fluid, a pipe cooler for the same and a fluid tight casing supported by said driven elements forming a combined jacket and reservoir surrounding said pump and motors.

6. A power transmitter comprising in combination a drive shaft, a rotary power pump on said shaft, rotary fluid motors, driven elements with which said motors are connected, a fluid supply casing surrounding said pump and motors, and a body of fluid in said casing communicating with and connecting said pump and motors.

7. A power transmitter comprising in combination a drive shaft, a rotary power pump on said shaft, rotary fluid motors, driven elements with which said motors are connected, passageways connecting said pump and motors, a valve in said passageways, a fluid tight reservoir surrounding said pump and motors, means within said reservoir for operating said valve, and a body of fluid in said reservoir communicating with and connecting said pump and motors.

8. A power transmitter comprising in combination, a drive shaft, driven shafts, a pump on said drive shaft, motors on said driven shafts, a fluid tight reservoir supported on said driven shafts and surrounding said pump and motors, an air cushion chamber within the reservoir in communication with the motor, passageways between the pump and motors, a body of fluid connecting said pump and motors through said passageways, and a valve for controlling the flow of said fluid, said passageways being in communication with said reservoir.

9. A power transmitter comprising in combination, a driving element, driven elements, a pump on said driving element, motors on said driven elements, a fluid tight reservoir surrounding said pump and motors communicating therewith and supported by said driven elements, passageways between the pump and motors, a body of fluid in said passageways forming a fluid circuit between said pump and motors and a valve adapted to regulate the flow of the fluid from the pump to operate the motors in either direction and to intercept the flow of said fluid and return the same to the pump thereby eliminating the motors from the fluid circuit.

10. A power transmitter comprising a drive shaft and driven shafts, a pump on the drive shaft, motors on the driven shafts, an oil tight casing supported on said driven shafts surrounding said motors and pump and adapted to form a combined jacket and reservoir for said motors and pump, a body of fluid contained in said pump, motors and casing and valved passageways communicating with said pump, motors and casing.

11. A power transmitter comprising a drive shaft and driven shafts, a pump on the drive shaft, motors on the driven shafts, an oil tight casing supported on said driven shafts surrounding said motors and pump and adapted to form a combined jacket and reservoir for said motor and pump, a body of fluid contained in said pump, motors and casing, an air cushion chamber within the casing connected with the motors and valved passageways communicating with said pump, motors and casing.

In testimony whereof, we have signed our names to this specification in the presence of two subscribing witnesses.

EDWIN FABIAN.
FREDRICK WIDMARK.

Witnesses:
K. H. HANSEN,
J. E. STRYKER.